United States Patent Office 2,914,524
Patented Nov. 24, 1959

2,914,524

REFINING PROCESS FOR VITAMIN $B_{12}$

William M. Ziegler, Clementon, N.J., assignor to American Cyanamid Company, New York, N.Y., a corporation of Maine No Drawing. Application March 18, 1957
Serial No. 646,576

2 Claims. (Cl. 260—211.5)

This invention relates to a purification procedure for producing pharmaceutical grade vitamin $B_{12}$ or a therapeutically acceptable concentrate of vitamin $B_{12}$. More particularly, this invention relates to adsorption of crude vitamin $B_{12}$ and elution of pharmaceutical grade $B_{12}$ or said concentrate utilizing a cationic exchange resin.

The term "vitamin $B_{12}$" is meant to include both the more common cyanocobalamine and various known vitamin $B_{12}$ analogs. These are, for example, the hydroxy analog (see Patent No. 2,738,301), chloro analog, dichloro analog, sulfate analog, thiocyanate analog, iodo analog, bromo analog, cyanate analog, nitrite analog, sulfide analog, etc. All of these latter analogs of vitamin $B_{12}$ can be called acid anion analogs of vitamin $B_{12}$ as disclosed and claimed in Patent No. 2,738,302.

Vitamin $B_{12}$ and its analogs can be derived from many different sources. In their several sources, vitamin $B_{12}$ and its analogs occur in a very low concentration, making it difficult to obtain a product of high activity. Compounding the difficulties in obtaining a pharmaceutical grade product is the presence of many impurities in the known sources of vitamin $B_{12}$ and its analogs.

It is an object of this invention, therefore, to provide a simple efficient purification method for obtaining pure vitamin $B_{12}$, its analogs, or a therapeutically acceptable concentrate of vitamin $B_{12}$ or its analogs from crude sources thereof. These objects and others will be apparent from the description that follows.

It has been observed many times in the prior work done with vitamin $B_{12}$ that it and its analogs possess a very high sensitivity to a low acid pH. For this reason, until the advent of the present invention, the workers in the field had conventionally avoided the use of a pH below 3. In fact, most of the prior purification work of this type had been carried out in the range between pH 4 and 7, since the maximum stability of vitamin $B_{12}$ has been established as being between pH 4.5–5.0. These various purification procedures utilizing this pH range of between 4 and 7 produced pure vitamin $B_{12}$ or concentrates thereof in quantities sufficient to merit commercial production. However, the art lacked a reasonably efficient method of purifying vitamin $B_{12}$.

It has now been unexpectedly found that increased yields of vitamin $B_{12}$ of enhanced activity can be obtained in an ion exchange purification procedure utilizing a pH in the range between about 1.5 and about 2.5. The reasons whereby such increased yields of vitamin $B_{12}$ having enhanced activity can be obtained by the use of the process described and claimed herein are not fully understood, for it can be illustrated that ordinarily vitamin $B_{12}$ in a water solution is extremely unstable to the very same acid concentrations producing this pH range.

The process of this invention involves first acidifying an aqueous solution of crude vitamin $B_{12}$ and impurities to a pH between about 1.5 and about 2.5. This acidification steps results initially in the precipitation of a part of the impurities which are then filtered off. The filtrate, which remains in the acidified condition initially obtained, is then passed slowly through a cationic exchange resin in the hydrogen cycle resulting in the adsorption of some of the $B_{12}$ activity thereon. The unadsorbed $B_{12}$ activity in the effluent is most conveniently recovered by passage of the effluent through another quantity of a cationic ion exchange resin. Alternatively, one may adsorb all of the $B_{12}$ activity on a single column of the resin by utilizing a larger quantity of the resin and by carefully controlling the feed rate of the impure solution.

Further impurities are removed by washing the resin successively first with acid water having a pH in the range between 1.0 and 2.5, then with a small quantity of acetone and finally with aqueous acetone (85% to 95% by volume acetone and 5% to 15% by volume water) at a pH of between 1.0 and 2.5. Following these various washing procedures, the $B_{12}$ activity is eluted from the resin with 50% to 75% acetone at a pH of about 1.0 to 2.5. The various pH ranges of 1.5 to 2.5 and 1.0 to 2.5 described above are essential features of the present invention. The adjustment of the pH of the impure solution prior to its being contacted with the cationic exchange resin is critical. If lower or higher pH values are utilized, materially decreased yields are obtained. Any common strong organic or inorganic acids may be used for these purposes, for example, HCl, $H_2SO_4$, $H_3PO_4$, oxalic acid, sulfonic acids, etc.

After eluting, the eluate is neutralized; a conventional strong base may be used for this purpose, for example, by adding sodium or potassium hydroxide until a pH of about 6.5 to 7.3 is obtained. On the other hand, neutralization may be accomplished by the use of a strongly basic anion exchange resin in the hydroxyl form. The use of a strongly basic anion exchange resin is preferred for neutralization since additional quantities of impurities are removed in the passage of the eluate therethrough; moreover, there is no salt formation as there is when a base is utilized. The neutralized eluate is then concentrated, for example, by heating under vacuum, and then mixed with a precipitating agent in order to precipitate the $B_{12}$ activity. Acetone is a convenient precipitating agent and is the one preferred for the purposes of this invention. The precipitated product is then filtered from the liquid phase and then dried. Yields of the final product of as high as 95% have been obtained from the initial crude material by utilizing the above-described process with a purity as high as 10 percent.

The cationic exchange resins suitable for use in the process of this invention are those known as carboxylic ion exchange resins. In the examples that follow, the process of this invention is particularly illustrated with respect to a carboxylic ion exchange resin sold by Rohm and Haas of Philadelphia, Pennsylvania, under the trademark "Amberlite IRC–50." The strongly basic anionic exchange resin preferred for neutralizing the eluate, as illustrated in the examples that follow, is a polystyrene quaternary amine type resin in the hydroxyl form made by Rohm and Haas under the trademark "Amberlite IRA–400." It will be understood that the present invention is not limited to the use of these particular ion exchange resins, but is fully effective with other carboxylic ion exchange resins and strongly basic anionic exchange resins.

In the examples that follow, the process of this invention is illustrated as to the starting material, particularly with respect to crude vitamin $B_{12}$ mash obtained by fermentation, as for example, a *Streptomyces cobalifaciens* fermentation preparation. It should be understood, of course, that the purification procedure described and claimed herein can equally well be utilized with other sources of crude vitamin $B_{12}$ material, such as liver extractions, *Streptomyces aureofaciens* fermentation mash, *Streptomyces griseus* fermentation mash, etc. In any procedure wherein a $B_{12}$ fermentation mash is utilized is a starting material, the mash should be initially filtered prior to passage through the cationic exchange resin, usually at a pH approaching neutrality, preferably about 6.5 with the use of a filter aid.

The present invention is further illustrated in the following specific examples which typify the presently preferred procedures of this invention. These specific examples are illustrative only, however, the scope of the invention being limited only by the scope of the appended claims.

EXAMPLE 1

Twenty liters of vitamin $B_{12}$ mash from a *S. cobalifaciens* fermentation were filtered with the aid of a 600 g. of Hyflo Supercel (a silica type filter aid). The filter cake was washed with one liter of water, the wash being combined with the filtrate to give a pooled broth assaying $5360\gamma/l$. The pH of 17.3 liters of this pooled broth was adjusted to pH 2.0 by the addition of hydrochloric acid and filtered to remove the impurity-containing precipitate. The filtrate was then passed through a column of carboxylic cationic exchange resin (Amberlite IRC-50) at a rate of 0.15 ml./g./min., part of the $B_{12}$ activity being adsorbed (the column was already partially loaded, containing 36,200 $\gamma$ of $B_{12}$ from a previous operation). Of the 92,730 $\gamma$ initially contained in the broth, 44,660 $\gamma$ remained in the effluent, indicating adsorption of 42,070 $\gamma$ on the column; activity on the column therefore totalled 84,270 $\gamma$.

The column was washed with two liters of water which had been acidified to pH 2 with hydrochloric acid, then with 50 ml. of acetone, and finally with 360 ml. of an 85% acetone-15% water mixture which had been adjusted to pH 1.3 with hydrochloric acid. The $B_{12}$ was then eluted with 1980 ml. of a 50% acetone-50% water mixture (acidified to pH 1.3 with hydrochloric acid) which was passed through the column at a rate of 0.04 ml./g./min. The eluate contained a total of 79,800 $\gamma$, a recovery of 95% of the $B_{12}$ on the column. The remaining 5% was accounted for in the column washes.

The eluate was adjusted to a pH of 6.8 by passing it through a column of a strongly basic anionic exchange resin (Amberlite IRA-400 which had previously been treated with 4% sodium hydroxide and washed with water until the pH of the effluent water therefrom was between 8.5 and 9.0). Vitamin $B_{12}$ was recovered from the neutralized solution by first concentrating it under vacuum at 35°–40° C. to 100 ml., then adding 2.5 liters of acetone to precipitate the product, followed by filtering. The precipitate, when air dried, weighted 560 mg. and assayed 86,600 $\gamma$ of $B_{12}$ per gram, a recovery of 56% of the activity adsorbed on the column.

The activity remaining in the broth after the passage through the first partially loaded carboxylic exchange resin adsorption column was subsequently recovered by passing the broth through a second partially loaded column (Amberlite IRC-50), and finally through a fresh column (Amberlite IRC-50) as described below. These latter two columns after passage of the broth therethrough then constitute "partially loaded columns" for subsequently treating new broth which is adsorbed successively on the two partially loaded columns and then on a fresh column.

The partially spent broth (that containing the activity not adsorbed by the first column) containing 44,660 $\gamma$ was passed through a second partially loaded column, 30,400 $\gamma$ being adsorbed by the second column, leaving 14,260 $\gamma$ in the effluent. Passage of this effluent through a fresh column resulted in the adsorption of 10,800 $\gamma$, leaving a spent broth containing 3460 $\gamma$ (4% of the initial broth activity).

EXAMPLE 2

Example 1 was repeated adjusting the broth to pH 2.5 instead of 2.0. The broth was filtered and passed successively through two partially loaded carboxylic cationic exchange resin columns and a fresh column, as described in Example 1. The water used to wash the columns prior to elution was adjusted to pH 2.5 instead of 2.0. Acetone washing and elution was carried out in the same manner as in Example 1. Only 3.7% of the initial vitamin $B_{12}$ activity in the broth was unadsorbed by the columns. Of the total amount of vitamin $B_{12}$ adsorbed, 67.7% was recovered by the 50% acetone elution procedure, and an additional 8.8% was recovered in the washes prior to elution.

EXAMPLE 3

The following comparison illustrates the superiority of the purification process of the present invention, even at the upper limit of the pH range, over a known process. The known process is designated "(A)" and the process of the present invention "(B)."

Two columns were loaded with 20 gm. each of carboxylic cationic exchange resin (Amberlite IRC-50) in the hydrogen cycle.

*Process (A).*—One volume of filtered broth similar to that of Example 1 containing 72,780 $\gamma$ of $B_{12}$ was adjusted to pH 3.0 and filtered, then passed through one of the columns. The column was then washed with 0.1 N hydrochloric acid until the effluent was colorless and then eluted with 50% aqueous acetone, 0.06 N with respect to hydrochloric acid.

*Process (B).*—A second volume of the filtered broth was adjusted to pH 2.5 and filtered, then passed through the second column. This was washed free of broth with 1.5 hold-back volumes of 0.01 N hydrochloric acid, then drained. After the addition of 15 ml. of acetone, the column was washed with 90% acetone made up to 0.04 N with hydrochloric acid, until the eluate was a pale straw color. The column was then eluted with 50% acetone made 0.04 N with respect to hydrochloric acid.

Both eluates from Process (A) and Process (B) were neutralized to pH 6.9 with sodium hydroxide solution. Each eluate was then evaporated to 50 ml. at room temperature and each poured into 1 liter of acetone causing precipitation of the activity in each. The precipitated solids of each were removed by filtration and dried over sulfuric acid. Yields of solids were 3.0 gm. for column (A) and 1.7 gm. for column (B).

*Assay results*

|  | Process (A) | Process (B) |
| --- | --- | --- |
| Broth | 78,600 $\gamma$ | 78,600 $\gamma$ |
| Spent Broth | 27,300 $\gamma$ | 22,100 $\gamma$ |
| Adsorbed by Column | 51,300 $\gamma$ | 56,500 $\gamma$ |
| Eluate | 35,800 $\gamma$ | 41,400 $\gamma$ |
| Solid Final Product | 18,000 $\gamma$ | 25,700 $\gamma$ |

It is thus apparent that at pH 2.5 a 42% greater yield of a product 2.5 times as potent was obtained. Anionic exchange resin neutralization of the eluates would have shown an even greater difference in product potency.

EXAMPLE 4

Example 1 was repeated adjusting the broth to pH 1.5 instead of 2.0. The broth was filtered and passed successively through two partially loaded carboxylic cationic exchange resin columns and a fresh column, as described in Example 1. The water used to wash the column prior to elution was adjusted to pH 1.5 instead of 2.0. Acetone washing and elution was carried out in the same manner as in Example 1. Only 2.8% of the initial $B_{12}$ activity in the broth was unadsorbed by the columns. Of the total amount of vitamin $B_{12}$ adsorbed, 85% was recovered by the 50% acetone elution procedure, and an additional 8.4% was recovered in the washes prior to elution.

I claim:
1. A process of purifying vitamin $B_{12}$ in an impure aqueous vitamin $B_{12}$-containing solution which comprises adjusting the pH of said impure solution to between about 1.5 and 2.5, then contacting said impure solution with a carboxylic cationic exchange resin in the hydrogen cycle to cause adsorption of vitamin $B_{12}$ thereon, removing impurities therefrom by successively washing the vitamin $B_{12}$-containing resin with acid water having a pH of between about 1.0 and 2.5, then with acetone containing at least 85% acetone with the balance water, and removing said vitamin $B_{12}$ from said resin by passing over said resin an acidified aqueous acetone mixture having a pH of about 1.0 to 2.5, said mixture comprising from about 50% to 75% acetone by volume and about 25% to 50% water by volume.

2. A process of purifying vitamin $B_{12}$ in an impure aqueous vitamin $B_{12}$-containing solution which comprises adjusting the pH of said impure solution to about 2.0, then contactnig said impure solution with a carboxylic cationic exchange resin in the hydrogen cycle to cause adsorption of vitamin $B_{12}$ thereon, removing impurities therefrom by successively washing the vitamin $B_{12}$-containing resin with acid water having a pH of about 2.0, then with acetone containing at least 85% acetone with the balance water, removing said vitamin $B_{12}$ from said resin by passing over said resin an acidified aqueous acetone mixture having a pH of about 1.3, said mixture comprising about 50% by volume acetone and about 50% by volume water, adjusting the pH of the thus obtained eluate to about 6.8 by passing it through a strongly basic anionic exchange resin.

References Cited in the file of this patent
UNITED STATES PATENTS

| | | |
|---|---|---|
| 2,628,186 | Shive | Feb. 10, 1953 |
| 2,684,322 | Colovos | July 20, 1954 |

FOREIGN PATENTS

| | | |
|---|---|---|
| 699,384 | Great Britain | Nov. 4, 1953 |
| 763,608 | Great Britain | Dec. 12, 1956 |